C. NELSON.
SUPPORT FOR CULINARY ARTICLES.
APPLICATION FILED SEPT. 10, 1910.
1,080,775.
Patented Dec. 9, 1913.
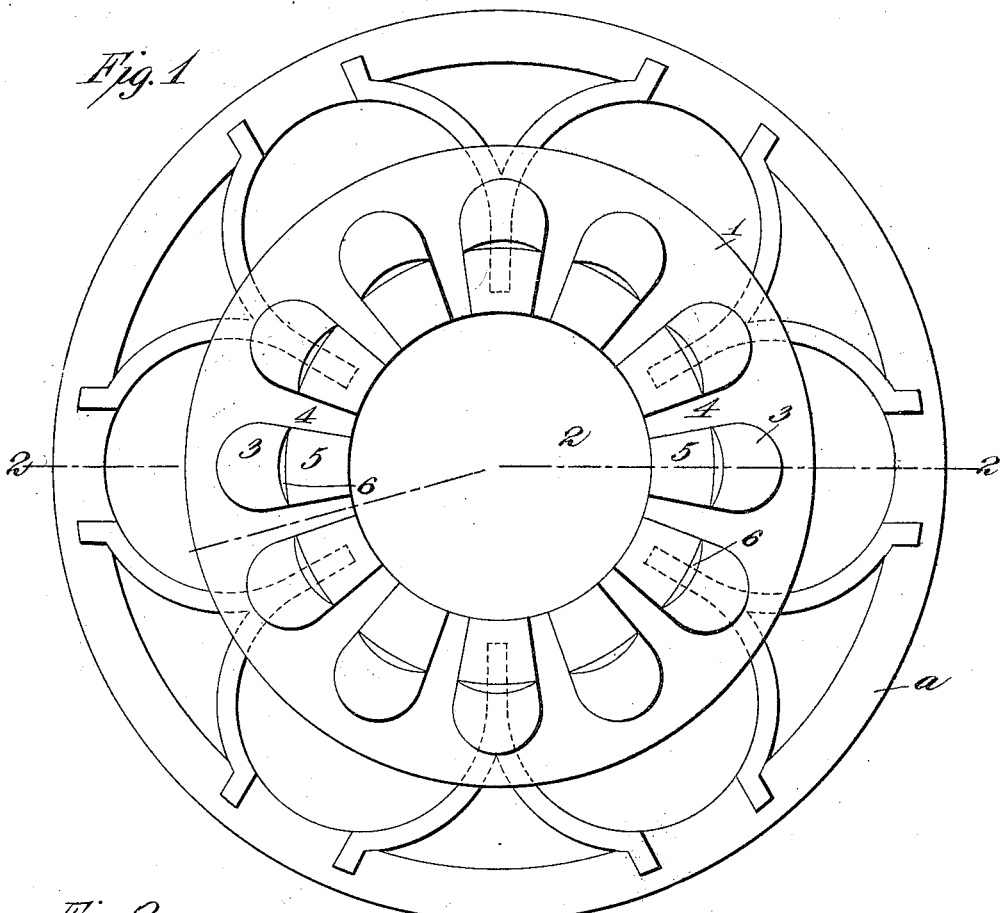
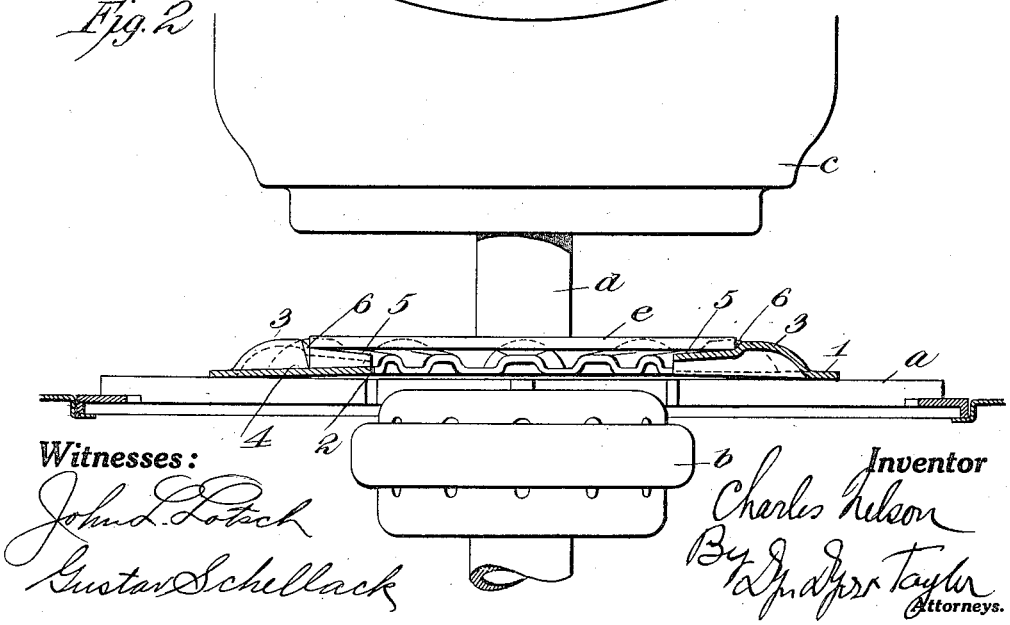
Witnesses:
Inventor
Charles Nelson

UNITED STATES PATENT OFFICE.

CHARLES NELSON, OF BROOKLYN, NEW YORK, ASSIGNOR TO S. STERNAU & COMPANY, OF NEW YORK, N. Y., A COPARTNERSHIP COMPOSED OF SIGMUND STERNAU AND LIONEL STRASSBURGER.

SUPPORT FOR CULINARY ARTICLES.

1,080,775.

Specification of Letters Patent. Patented Dec. 9, 1913.

Application filed September 10, 1910. Serial No. 581,372.

*To all whom it may concern:*

Be it known that I, CHARLES NELSON, a citizen of the United States, residing in the borough of Brooklyn, county of Kings, city and State of New York, have invented a new and useful Support for Culinary Articles, of which the following is a specification.

The object I have in view is the production of a device or support for culinary articles and the like, for use upon stoves, particularly gas, gasolene or alcohol stoves, in which the culinary article will be rigidly supported, and in which the heat from the flame will be properly distributed over the base of the article.

The invention is particularly used in connection with coffee pots of the type which employ a small heating chamber with a disk at the bottom thereof, which forms a supporting foot, and also serves to radiate heat to the small chamber and at the same time to insulate the bottom of the receptacle of the utensil from the direct action of the flame. The invention, however, is not limited in its use with utensils of this character, as it may be used with chafing dishes, tea pots and other forms of culinary articles.

In the drawings Figure 1 is a plan view showing an embodiment of my invention resting upon a grid of an alcohol stove. Fig. 2 is a section of the same on the line 2—2 of Fig. 1, also showing the burner of the stove and the bottom of the utensil.

In both of the views, like parts are designated by the same reference characters.

In the drawings, *a* is the grid or other device forming a portion of the stove, *b* (Fig. 2) is the burner of the stove, *c* is the receptacle, *d* is the small heating chamber and *e* is the plate on the bottom of the chamber forming the foot of the utensil.

It is to be understood that the form of stove shown and the particular utensil illustrated are used solely for the purpose of illustrating the principles of my invention, and that the invention is not limited in any way to the use of such devices in connection with it.

My improved support, according to the embodiment illustrated, comprises a disk 1, which is interposed between the grid *a* and the utensil. The center opening 2 of the disk is preferably made as large as is permissible to accommodate utensils of the minimum size which may be used. The disk is slightly dished (see Fig. 2) so that it rests solely upon its outer edge upon the grid. It is not essential, however, to make it this way. The utensil is supported upon arches 3 on the disk, such arches being preferably equi-distant spaced around the disk. The spaces between the arches form radiating passages 4. The arches, as shown, extend from the center opening 2 to a point adjacent to the outer edge of the disk. The outer edges of the arches are rounded, as shown, and their sides are straight, and between adjacent arches the sides are nearly parallel. The arches being wider near their outer ends than at their inner ends, it is apparent that with a given amount of material and a given thickness they can be made higher at the front than at the rear. The utensil rests upon these arches, the hot gases from the burner *b* passing out through the radiating passages 4, and ascending around the outer edge of the foot *e*.

For the purpose of centering the utensil and holding it upon the arches, each arch for about half its length toward the inside of the disk is flattened, forming a table 5. At the front end of the table there is a vertical wall 6, forming a shoulder. These shoulders, considered in connection with all of the arches, produce an interrupted, circular flange. The diameter of this flange is slightly greater than the diameter of the foot of the largest utensil which will be used with the support. This flange serves as a means for holding the utensil and properly centering it over the center opening 2. The tables 5 incline inward slightly, as shown in Fig. 2, so that the foot *e* or other portion of the utensil which rests upon the disk, will engage at its periphery only. This to some degree assists in centering the utensil when the foot of the utensil is smaller than the circular flange 6.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now particularly described my invention, and in what manner the same is to be performed, what I claim as new and desire to secure by Letters Patent, is:—

A support for culinary articles which comprises a disk with a central opening, arched portions on the disk with radiating passages between the arched portions, an inclined table on the inner portion of each arched portion and an interrupted, circular flange on the arched portions for centering the bottom of the utensil, the cavities formed by the arched portions communicating with the central opening.

This specification signed and witnessed this 31st day of August, 1910.

CHARLES NELSON.

Witnesses:
 JOHN L. LOTSCH,
 GUSTAV SCHELLACK.

Copies of this patent may be obtained for five cents each, by addressing the "Commissioner of Patents, Washington, D. C."